Aug. 25, 1964 F. H. LANGMEAD ETAL 3,145,605

APPARATUS FOR SETTING UP AND TOOLING WORKPIECES

Filed Jan. 16, 1961 4 Sheets-Sheet 1

Aug. 25, 1964 F. H. LANGMEAD ETAL 3,145,605

APPARATUS FOR SETTING UP AND TOOLING WORKPIECES

Filed Jan. 16, 1961 4 Sheets-Sheet 2

Aug. 25, 1964 F. H. LANGMEAD ETAL 3,145,605

APPARATUS FOR SETTING UP AND TOOLING WORKPIECES

Filed Jan. 16, 1961 4 Sheets-Sheet 3

APPARATUS FOR SETTING UP AND TOOLING WORKPIECES

Filed Jan. 16, 1961 4 Sheets-Sheet 4

3,145,605
APPARATUS FOR SETTING UP AND TOOLING WORKPIECES

Frederick Henry Langmead and Peter Norman Langmead, both of Ashford Common, England, assignors to Zealand Engineering Company Limited, Ashford, England, a British company Filed Jan. 16, 1961, Ser. No. 82,915
4 Claims. (Cl. 83—413)

This invention relates to apparatus for setting-up and tooling work-piece and has for an object to enable successive tooling operations to be carried out in a simple and expeditious manner. The invention is particularly concerned with repetition work in which a set of holes is required to be accurately formed in a number of metal sheets so as to conform with a predetermined layout. Thus the invention is of value in batch production of chassis panels etc., for electronic equipment.

The apparatus is of the kind comprising a bed plate or other support (hereinafter referred to as a "support"), a tool holder movable towards and away from the support, a work holder and a template holder connected together, a mounting for said connected holders so arranged that said connected holders may together have two components of movement transverse to the movement of the tool holder and a device which co-operates with the template, when in said template holder, so as to control the movement of the tool holder.

According to this invention an apparatus of the kind referred to above is characterised in that said device comprises either a holder for a stylus or feeler or a light source and a light sensitive cell between which the template moves which has associated therewith tool control means which when predetermined locations on the template are brought either opposite and engaged by the stylus or feeler or opposite the light source and light sensitive cell causes the tool to operate on the work at locations corresponding to said locations on the template.

Preferably indicating means are provided enabling the work holder to be positioned at any required location with respect to said tool and to a datum point on the support or which enable the stylus or feeler to be brought opposite a location on the template or on a work-piece which has been placed in the template holder the position of which, with respect to a datum position, requires to be recorded, so that by reaching said scales the position of the location, with respect to the datum position, may be recorded.

The mounting for the work holder and template may comprise a compound slide in which the two sets of slides and slideways are mounted one on the other at right angles and one of which slideways is fixed to said support.

The aforesaid indicating means may comprise two scales and associated vernier devices associated respectively with the two slides and slideways.

In such an arrangement said tool holder and said device for co-operating with the template are disposed apart along a line at right angles to the length of that slideway which is fixed to said support.

In one construction according to the invention the tool holder is provided with a tool for forming holes in the work and means are provided for reciprocating the tool holder towards and away from the work and wherein said tool control means associated with said device are arranged to initiate the reciprocation of the tool.

The feeler or stylus is movable into and out of engagement with holes in the template.

In a preferred form of construction said feeler holder is duplicated with two holders being arranged at opposite sides of the template in axial alignment and one of them being arranged to hold a feeler of such a size that there is clearance between it and each hole in the template which holder is gravity or spring loaded towards the template and the other being arranged to hold a second feeler of such size as to be a sliding fit in each hole, and both of which feelers have a slight lead so as to facilitate their entry into a hole and both being reciprocable towards and away from the template and wherein power means is arranged to reciprocate the larger of the two feelers which power means is controlled by the movement of the smaller stylus into a hole under said gravity or spring loading which movement results in the larger stylus entering the hole in the opposite direction under power whereby a final accurate locating movement is imparted to the stylus.

The movement of the second feeler into a hole may be arranged to initiate the movement of said tool into engagement with the work.

The said second and larger feeler may be reciprocated by a motor which is arranged to be under dual control of the movement of the first feeler and of the punch or punch operating motor so that movement of the smaller feeler into a hole in the template energises the first said motor to move the larger feeler into said hole and to engage the first feeler thereby applying return movement to it, which return movement actuates control means for the punch motor causing it to move in a direction to effect a punching operation, which movement of the motor during or after effecting the punching operation actuates control means for the first said motor so as to withdraw the second feeler from the hole in the template and releasable detent means for holding the first feeler clear of the template which are engageable upon said return movement of that feeler.

Preferably said motors are reciprocating fluid energised motors, the valves of which are controlled jointly by parts moving with the first said feeler and with the pump.

The following is a description of one form of apparatus suitable for forming a template with punched holes and then by use of the template punching a succession of plates with similar disposed holes, reference being made to the accompanying drawings in which.

Figure 1:
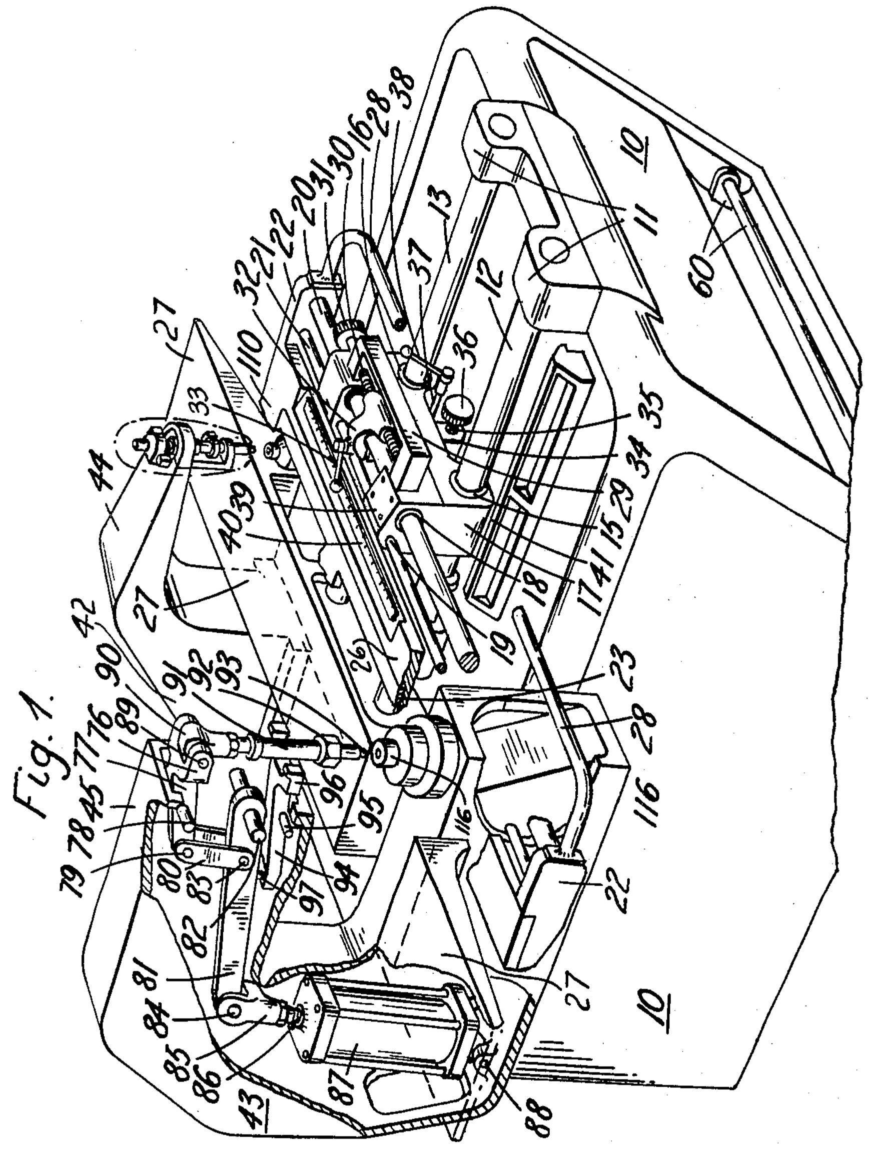
FIGURE 1 is a perspective view of the general arrangement of the apparatus, parts being cut away to show other parts.

Referring to FIGURE 1, the main support 10 of the apparatus is in the form of a heavy casting, the upper part of which is provided at the forward and rearward ends with two upstanding supports 11. Secured between the forward and rearward supports are two similar guide rods 12 and 13 which extend respectively through bushes 15 and 16 in a block 17. At least one of the bushes is formed with recirculating type of ball bearings each comprising an exposed groove extending axially along the inner face of the bush and joined at its ends by curved passages within the thickness of the bush with another axially extending groove also within the thickness of the bush so the balls may all roll from one axially extending groove to the other.

The block is substantially H-shaped as viewed in front and rear elevation, the bushes 15 and 16 being disposed at the bottom of the upright limbs.

The upper ends of the upright limbs are each provided with two bushes or bores 18 and 19 disposed apart in the direction of the length of the rods 12 and 13, which bushes or bores are engaged by two different sized rods 20, 21 which bushes or bores are provided with recirculating ball bearings (not shown). Thus the rods 20, 21 are disposed at right angles to the rods 12 and 13.

Figure 3:
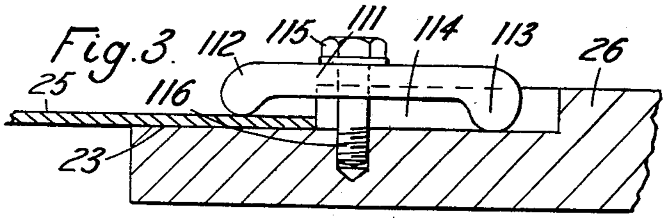
FIGURE 3 is a section through a part of the template or work holder showing the clamping means.

The rods 20 and 21 extend between and are fixed to members 22 (see FIG. 6) which in their turn are fixed to a cross member 26. The cross member is stepped at 23 along that edge which is remote from the rods 20 and 21, and the marginal portions of the template 24 and work-piece 25 rest on this step and on two spaced platforms 27 (FIG. 1) fixed to or forming part of the main frame 10 of the apparatus. The template and work-piece are located in datum positions on the step by straight edges 109 (FIG. 6) formed on parts 110 integral with or attached to the cross member 26 and are held in position by clamping fingers 111 having rounded projections 112, 113 at opposite ends which bear on the marginal portions of the template and work-piece as best seen in FIGURE 3 and on the bottom of slots 114 formed in the cross-member 26. Clamping screws 115 pass through holes in the fingers 111 and engage threaded holes 116 in the bottom of the step.

Secured between the two members 22 is a looped handrail 28 (FIG. 1). Fixed between the upper extremities of the H-shaped part is a channel shaped yoke 29 in which a lead screw 30 is rotatably mounted but fixed against axial movement and which lead screw is provided with a manipulating knob 31.

The lead screw engages a threaded hole in one part 32 of a clamp which straddles the guide rod 20. The two parts of the clamp are hinged together on one side of the guide rod and are provided with lugs on the other side, the lugs on the lower clamp member being provided with a threaded hole and the lug on the member 32 has a hole through which a plain portion of a clamping screw extends. The threaded part of the clamping screw engages the threaded hole in the lug of the lower clamping member. The clamping screw is provided with a suitable manipulating member 33.

The underside of the cross bar of the H-shaped block is provided with two downwardly extending lugs spaced apart in the direction of the length of the guide rods 12 and 13, one of which lugs is shown at 34 and extending through these lugs is a lead screw 35 provided with a manipulating knob 36. The lead screw engages a threaded hole in one of the parts of another two part clamp similar to the clamp 32 and two parts of this second clamp straddle the guide rod 12. The clamp may be operated by a cam (not shown) which is rotated by a spindle 37 provided with a manipulating lever 38. The upper extremity of one of the upright limbs of the H-shaped block has mounted upon it at 39 two optical type measuring gauges which are directed respectively on to two scales 40, 41 the first of which extends in the direction of the length of the guide rods 20, 21 and the other in the direction of the guide rods 12 and 13.

Fixed to the rear part of the main support 10 are two upwardly extending rigid standards 42, 43 having overhanging portions 44 and 45.

Figure 2:
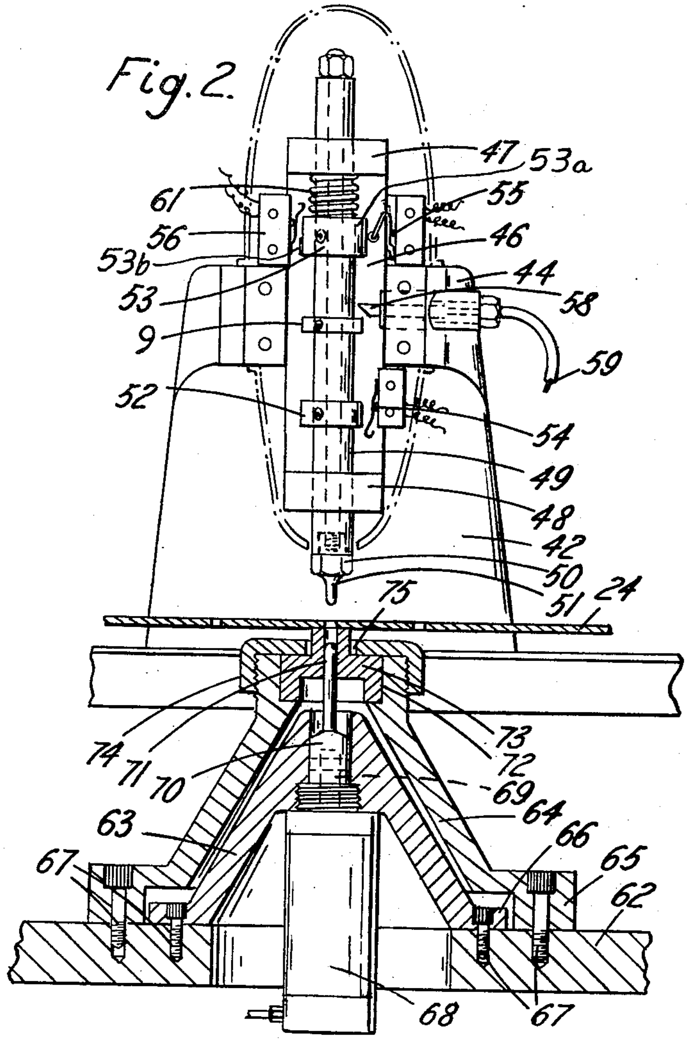
FIGURE 2 is a part elevation and part section of the feeler mechanism.

As best seen in FIGURE 2 there is fixed to the overhanging portion 44 of the standard 42 an upright yoke piece 46 having flanges 47, 48 provided with vertical bearings in which reciprocate a spindle 49. The spindle is provided at its lower end with a holder 50 for a feeler 51 having a rounded extremity. Fixed to the spindle between the two flanges 47, 48 are cams 52, 53*a* and 53*b* (FIG. 7) the former of which actuates a switch 54 and the latter two switches 55, 56 which three switches may be micro-switches. The spindle also has fixed to it an abutment 9 which may be engaged by a releasable spring latch 58 operated by a flexible cable 59 connected at its end to a pivoted pedal control 60 (see FIGURE 1). A spring 61 encircles the spindle between the upper cam 53 and flange 47, which spring is in a loaded condition when the spindle is held by the latch 58.

Secured to a part 62 of the main frame 10 (see FIGURE 2) are two nested hollow conical members 63, 64 having flanges at their lower ends at 65, 66 provided with holes through which extend clamping screws 67.

Figures 6, 7:
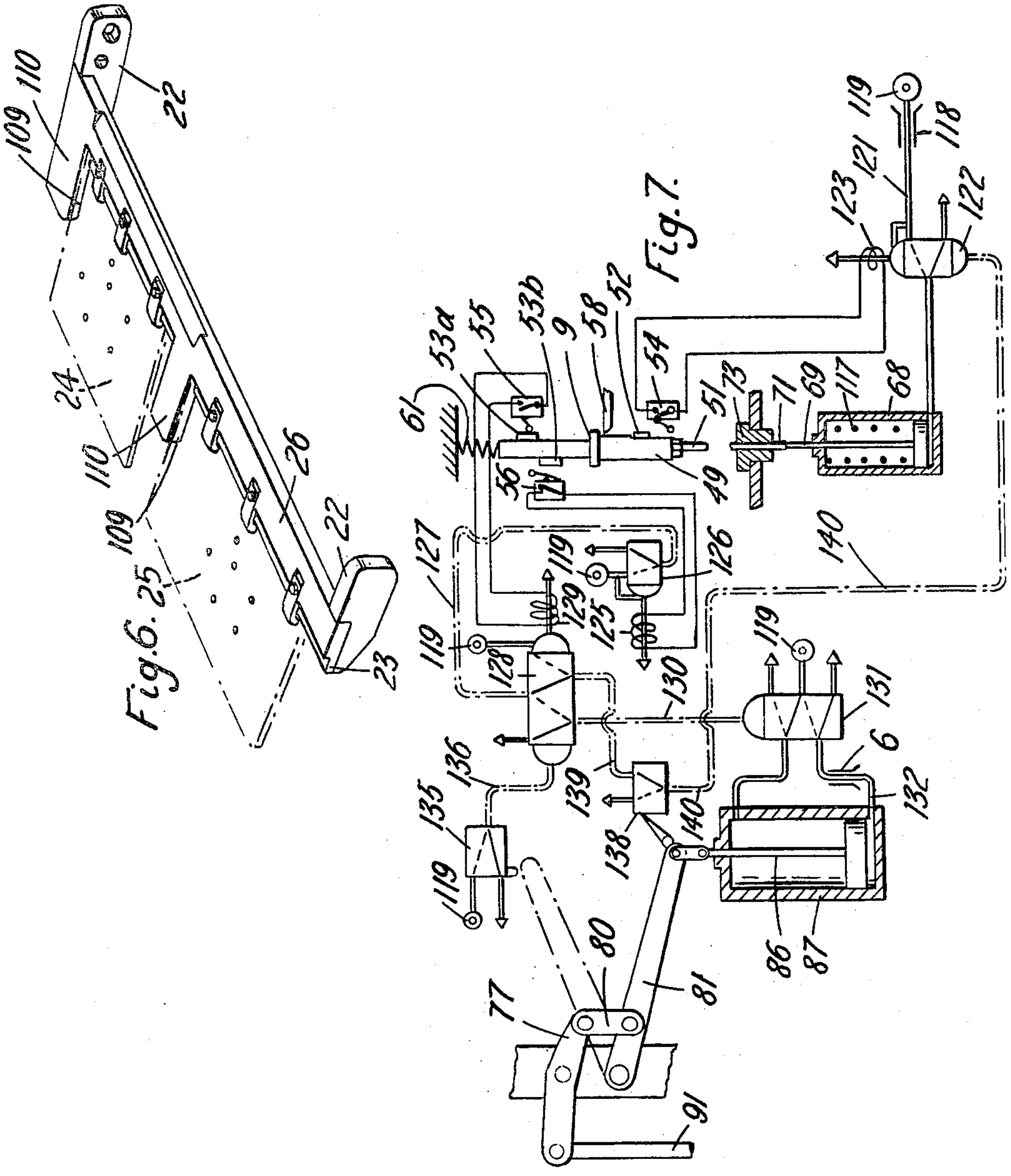
FIGURE 6 is a perspective view of the template and work holder.
FIGURE 7 is a pneumatic and electric circuit diagram embodying the control means for the feelers and punch.

Secured within the inner hollow conical member is the cylinder 68 of a single acting pneumatic motor the plunger 69 of which is urged downwardly by a spring 117 FIGURE 7, secured to it is a holder 70 for a second feeler 71 which is of slightly larger diameter than the first feeler 51 so as to be a good sliding fit in the holes of the template.

The uppermost face of the outer conical member is provided with a socket 72 which accommodates a guide 73 for the second stylus and which guide is held in the socket by an internally threaded rim 74 of a cap, the upper wall of which is provided with an opening 75 through which a reduced part of the guide 73 extends.

The overhanging part 45 of the other standard 43 is of a hollow character and extending out from the forward end thereof is the forked extremity 76 of a rocking lever 77 having trunnions 78 which engage bearing holes in the side wall of the hollow part 45. The other extremity of the rocking lever is pivotally connected at 79 to links 80 which straddle and are pivoted at 83 to a lever arm 81. The lever arm is provided with trunnions 82 at its forward end and engages holes in the side of the hollow part 45. The other end of the lever 81 is pivoted at 84 to an adjustable forked head at the end of a piston rod 86 of a double acting pneumatic motor. The cylinder 87 of the motor is pivoted at 88 to the base portion of the standard 43.

Pivoted at 89 between the limbs of the fork 76 is a head 90 adjustably secured to the stem of the ball part 7 (see FIGURE 4) of a ball socket connection the socket part being formed at the upper end of a punch operating spindle 91. The two parts of the joint are held together by a cap 8 which is in screw thread engagement with the spindle. The lower end of the spindle is provided with a holder 92 for the punch 93.

A work stripping lever is associated with the punch and has trunnions 95 which engage bearing holes in the side walls of the overhanging part 45. One end of the lever is provided with a forked head portion 96 whereas the other end underlies the lever arm 81 and is provided with an adjusted screw 97 which abuts the underside of that lever.

Figure 4:
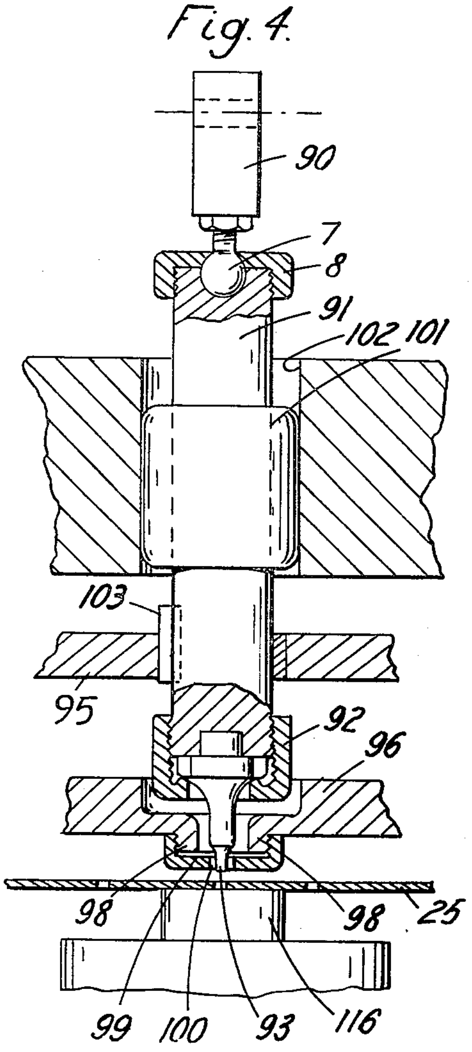
FIGURE 4 is a part elevation and part section through the mounting for the punch.

As will be seen from FIGURE 4 the fork arms 96 are provided on the underside thereof with externally threaded part annular rim portion 98 which are engaged by a stripping cap 99 having a hole at the centre thereof through which the punch 93 may extend.

The punch spindle 91 is provided with an enlargement 101 which engages a bearing 102 in a fixed part of the overhanging portion 45 of the standard 43 and is also provided with a key 103 which engages a keyway in another fixed part of the overhanging part 45.

Figure 5:
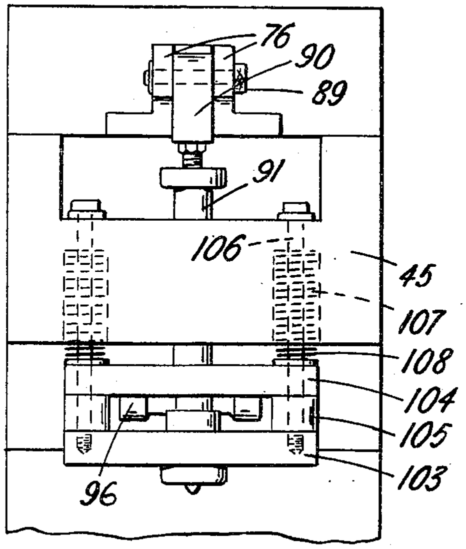
FIGURE 5 is an elevation of the stripping mechanism used in conjunction with the punch.

As will be seen from FIGURE 5 the fork arms 96 extend between two plates 103, 104 spaced apart by spacing washers 105 so that there may be lost motion of the arms between them. Bolts 106 extend through holes in the end of the overhanging part 45 and in the plates 104 and engages threaded holes in the plate 103. The holes in the overhanging part 45 are enlarged at 107 and the bolts are encircled by spring washers 108 which are disposed between the plate 104 and the bottom of the enlarged hole 107. With this arrangement when the punch pneumatic motor 86, 87 imparts clockwise movement to the lever arm 81 the punch spindle 91 is moved downwardly and the screw 97 on the stripping lever 94 follows the movement of the lever arm 81 under the action of the spring washers thus moving the stripping lever clockwise. Upon return movement of the plunger spindle the spring washers maintain the stripping cap 99 in engagement with the work and the punch is drawn through it, during this time the forks are taking up lost motion between the two plates 103, 104 and when the fork engages the upper plate 103 both punch and the stripping member are moved upwardly.

Fixed to a part of the main support 10 beneath the punch is a die 116 in which the punch is a good sliding fit.

The sequence of the operation is as follows:

Assuming a template 24 and a work-piece 25 have already been formed and have been secured in position in the holder 23 and the feeler spindle 49 is in its uppermost position with the abutment resting above the spring latch 58, the operator depresses the foot pedal 60 which releases the latch 58 and the feeler spindle together with the feeler 51 moves downwardly until the latter engages the face of the template. The operator then by means of the looped handle 28 moves the template and work holder 23 into such a position that the smaller feeler 51 enters the hole in the template and roughly locates it. The feeler is forced downwardly by the spring 61 and in so doing actuates one of the switches 54 which in its turn sets the first air motor 68 into operation whereby the second and larger feeler 71 is forced upwardly into the hole accurately locating the template and the work.

The upward movement of the second feeler 71 forces the first feeler 51 upwardly together with its spindle 49 which actuates the two other switches 55, 56 which control the operation of certain pneumatic valves hereinafter described which result first in the plunger of the pneumatic punch motor being moved in a direction to effect a punching operation and then to move in the opposite direction to withdraw the punch and also to allow the plunger of the first pneumatic motor to be returned to its initial position. The upward movement of the second feeler carrying with it the first feeler will cause that feeler to be latched by the spring latch 68. These movements are brought about by the pneumatic and electric switches as shown in FIGURE 7.

In the following description the conduits shown in full line transmit air to and from the source of pressure 119 and the atmosphere indicated by arrows directly through the appropriate valves whereas the conduits shown in chain line transmit pneumatic impulses between the valves for the purpose of actuating the valves. When the parts are in a datum position with the spindle 49 retained by the spring latch 58, all the micro switches are open and the valves in the full line positions.

It will be seen from FIGURE 7 that there is a source of pneumatic pressure 119 in communication through a flow regulator 118 and conduit 121 with a pneumatic valve 122. The valve 122 is actuated in one direction by a solenoid 123 and is reset in the opposite direction by pneumatic means. The coil is energised by the closing of the switch 54 when the feeler 51 enters the hole in the template. This valve 122 places the pipe 121 into communication with the bottom of the cylinder 68 of the first pneumatic motor thus causing the spindle 49 to rise.

As the feeler 51 and spindle 49 ascend under the pressure applied by the lower feeler 71, the upper cam 53$a$ causes the micro switch 55 to give a brief electrical impulse to the solenoid coil 129 thus setting the valve 128 into the dotted position. In this position the valves 126, 131 communicate with one another through the conduits 127, 130 but since the valve 126 is in a position in which the conduit 127 is in communication with the atmosphere no impulse is transmitted to the valve 131. When the spindle 49 reaches its uppermost position the cam 53$b$ closes the micro switch 56 energising the solenoid coil 125 of the valve 126 and setting the valve into the dotted position, compressed air from the source 119 passes through the valve 126 into the conduit 127 through the valve 128 and conduit 130 to the valve 131 which is thereby set pneumatically into the dotted position. In this position the valve 131 admits air from the compressed air source 119 through the uni-direction flow device 6 and conduit 132 into the cylinder 87 forcing the piston rod 86 therein upwardly and the punch spindle 91 downwardly by means of the parts 8, 80 and 77. When the arm 81 reaches its uppermost position it engages the actuating member for the valve 135 moving it into the dotted position. This admits air from the source of pressure 119 through the valve 135 into the conduit 136 to a pneumatic control for the valve 128 which resets the valve 128 in the full line position causing the air pressure which is still in the conduit 127 to be transferred from the conduit 130 to the conduit 139. At this time the conduit 139 is closed by the valve 138 which is in its dotted position. The conduit 130 will be connected to atmosphere by the valve 128 as a result of which the valve 131 resets under the action of a spring associated with it into the full line position and the space beneath the piston in the cylinder 87 communicates with the atmosphere whereas the space above the piston communicates with the source of pressure 119 and the piston and piston rod 86 descend releasing the valve 135 which returns to the full line position.

When the piston rod 86 and arm 81 have descended and engaged the operating member of the valve 138 it will move the valve into the full line position and the pressure which is built up in the conduit 139 passes through the valve 138 into the conduit 140 and thence to the valve 122 thus pneumatically resetting that valve to the full line position allowing air from the bottom of the cylinder 68 to exhaust to atmosphere and the piston rod 69 and larger feeler 71 to descend under the action of the spring 117. The spindle 49 also descends under the action of the spring 61 until the abutment 9 engages the foot controlled spring latch 58. The descent of the spindle 49 causes the micro switch 56 to be reset under the action of a spring associated with it moving the valve 126 into the full line position and placing the conduits 127 and 139 into communication with atmosphere.

To form a template in the first instance a plate is introduced into the opening of the frame 23 opposite the punch whereas the other opening is left clear. A drawing will have previously been prepared on which is marked the distances of the centre of each hole to be punched from two datum lines at right angles to one another or a table is prepared showing these co-ordinate distances for each hole from one corner of the plate.

One of the control members 33, 38 is tightened and the other loosened, for example, if the control member 38 is tightened, the control member 33 is loosened. The operator imparts movement to the work holder in a transverse direction viewing the appropriate scale 40 through the optical gauge until the appropriate co-ordinate is approached whereupon the clamping lever 33 is tightened and the final movement to the holder is imparted by rotating the manipulating knob 31 which enables him to set the holder for that particular co-ordinate through a vernier device in the optical viewer.

The control member 38 is then unclamped and the operator then moves the holder in a backward or forward direction until the other co-ordinate is approached in the other viewer whereupon the clamping member 38 is again tightened and the manipulating knob 37 operated until the correct co-ordinate is shown in the viewer. The operator then depresses the foot pedal 60, the first said feeler descends and is engaged by the upward movement of the second feeler setting into operation the mechanism for controlling the valve of the punch motor which effects a punching operation. The clamp control 33 is then loosed and the same sequence of operation is then repeated for the next hole to be punched.

A somewhat similar procedure, may be employed to check whether a template or work-piece has been correctly formed with holes or for measuring the positions of holes in a work-piece or template a drawing or record of which is not available.

For this purpose the work piece or formed template is placed in the template holder and the two gauges are zeroized when the feelers are opposite an arbitrary datum point on the workpiece or template which is marked. The feelers are then brought successively opposite each hole by the manipulative procedure set out above and readings are taken of the two scales at each hole and are recorded.

We claim:

1. An apparatus for setting up and tooling a workpiece comprising a fixed support, a work holder and a template holder connected together, a template having a number of holes therein secured in said template holder, a mounting between said support and the connected holders, which mounting has guideways constraining the connected holders to move in each of two directions at right angles to one another, a positioning mechanism at a single location on the support and having two movable parts insertable successively into any of the holes in the template from the opposite sides thereof the first of which parts to enter a hole being a loose fit therein and the other of which is an exact fit, a tool holder at another location on said support, mountings for the positioning mechanism and tool holder constraining them to move towards and away from the template and work holder respectively, a motor for effecting movement of the tool holder, control means for said motor, means responsive to the movement of the close fit part of the positioning mechanism and which responsive means operates the control means for the motor when said close fit part has entered a hole.

2. An apparatus according to claim 1 wherein said positioning mechanism comprise two reciprocable feeler holders being arranged on opposite sides of the said holder in axial alignment and one of them being arranged to hold a feeler of such size that there is clearance between it and each hole in the template which feeler holder is loaded towards the template and the other holder being arranged to hold a second feeler of such size as to be a sliding fit in each hole and both of which feelers have a slight lead so as to facilitate their entry into a hole and both being reciprocable towards and away from the template and wherein power means is arranged to reciprocate the larger of the two feelers, a control for the power means actuated by the movement of the smaller feeler into a hole which power means when energized moves the larger feeler into the hole in the opposite direction to the entry of the smaller feeler, wherein said motor control is actuated by the movement of the larger feeler into a hole whereby the tool is moved into engagement with the work.

3. An apparatus according to claim 2 wherein the larger feeler is reciprocated by a feeler motor having a control actuated jointly by means conditioned by the smaller feeler and by means conditioned by movement of the tool so that movement of the smaller feeler into a hole in the template energizes the feeler motor to move the larger feeler into the hole into engagement with the smaller feeler thereby applying return movement to it which movement activates control means for the tool motor causing it to move in a direction to operate upon the work, which movement of the tool actuates the control means for the feeler motor so as to withdraw the larger feeler from the hole in the template and releasable detent means for holding the smaller feeler clear of the template which detent is brought into engagement with the smaller feeler upon its return movement.

4. An apparatus according to claim 3, wherein said motors are reciprocating fluid energized motors having valves controlled jointly by parts moving with the first said feeler and with the tool holder.

References Cited in the file of this patent

UNITED STATES PATENTS

| | | |
|---|---|---|
| 2,144,972 | Hirst | Jan. 24, 1939 |
| 2,199,103 | Jeffreys | Apr. 30, 1940 |
| 2,488,610 | Stackawicz | Nov. 22, 1949 |
| 2,738,692 | Jones | Mar. 20, 1956 |
| 2,816,465 | Honnef | Dec. 17, 1957 |
| 2,918,835 | Watson | Dec. 29, 1959 |
| 2,958,247 | Levine | Nov. 1, 1960 |
| 2,975,522 | Postel | Mar. 21, 1961 |
| 2,994,000 | Schoppelrey | July 25, 1961 |

FOREIGN PATENTS

| | | |
|---|---|---|
| 409,984 | Italy | Mar. 14, 1945 |
| 518,160 | France | May 20, 1921 |
| 588,560 | Great Britain | May 28, 1947 |